United States Patent Office.

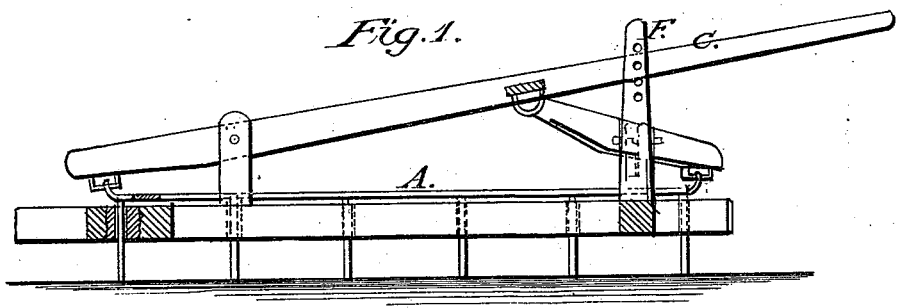
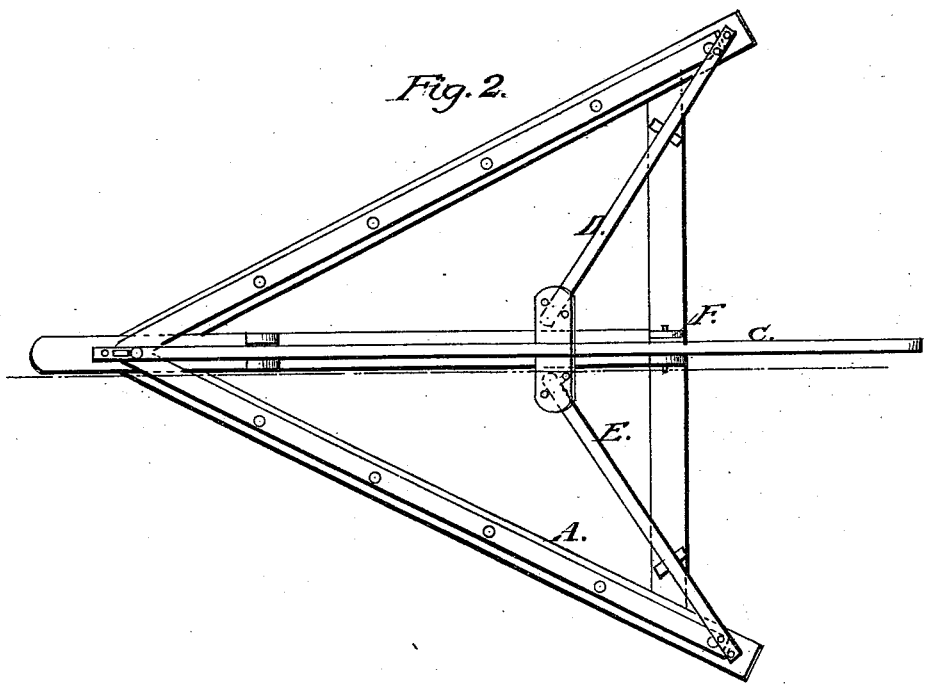
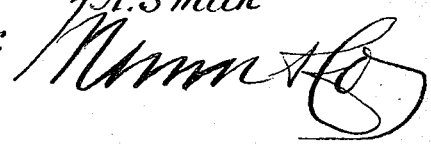

FENTON Y. TAVENNER, JOHN W. GALBRAITH, AND ALFRED SMITH, OF SEDALIA, MISSOURI.

Letters Patent No. 94,044, dated August 24, 1869.

IMPROVEMENT IN HARROWS.

The Schedule referred to in these Letters Patent and making part of the same.

To all whom it may concern:

Be it known that we, FENTON Y. TAVENNER, JOHN W. GALBRAITH, and ALFRED SMITH, of Sedalia, in the county of Pettis, and State of Missouri, have invented a new and useful Improvement in Harrows; and we do hereby declare that the following is a full, clear, and exact description thereof, which will enable others skilled in the art to make and use the same, reference being had to the accompanying drawings, forming part of this specification.

This invention relates to improvements in harrows, intended to facilitate cleaning the teeth when clogged with straw, grass, roots, &c., and to provide an arrangement whereby the teeth may be so adjusted that they may be prevented from engaging with the ground when it is desired to move the harrow from one field to another, or along a road.

Figure 1 represents a longitudinal sectional elevation of our improvement, and

Figure 2 is a plan view of the same.

Similar letters of reference indicate corresponding parts.

Instead of securing the teeth firmly to the framing, as commonly done, we arrange them so as to work freely up and down through the frame, and secure them at their upper ends to metallic bars, A. These bars we connect, at any suitable points, to a system of levers, C D E, so connected together, and supported in fulcra on the framing, that the operator may raise all the teeth upward in or through the framing, simultaneously by a proper movement communicated to the levers.

F represents a slotted post, rising upward from the framing, wherein the long arm of the lever C works.

The teeth are maintained in their proper working-position by elevating the said long arm, and securing it in the elevated position by a pin passing through the said post under the lever. When the teeth become clogged, as they frequently do, it is only necessary to withdraw the pin and allow the lever to fall, when the frame will fall to the ground, and thereby clear the teeth. In this condition the teeth will be prevented from engaging with the ground when it is desirable to move the harrow along a road or over a field which it is not desired to harrow.

To clean the teeth of harrows, as commonly constructed, it is necessary to raise them up, one side at a time, and scrape off the refuse matter with the hands or feet, which is laborious and dangerous, and requires considerable time, whereas, by our improved plan, it can be readily accomplished without stopping the team, and with very little labor.

Having thus described our invention,

We claim, and desire to secure by Letters Patent—

The combination, with the teeth, the framing, and the metallic bars A, of the levers C, D, and E, substantially as specified.

The above specification of our invention signed by us, this 2d day of January, 1869.

FENTON Y. TAVENNER.
JOHN W. GALBRAITH.
ALFRED SMITH.

Witnesses:
J. V. TOBIAS,
JAMES M. MILLS.